United States Patent [19]

Richter

[11] Patent Number: 4,575,297

[45] Date of Patent: Mar. 11, 1986

[54] ASSEMBLY ROBOT

[76] Inventor: Hans Richter, Oberlander Str. 123, D-8900 Augsburg, Fed. Rep. of Germany

[21] Appl. No.: 527,645

[22] PCT Filed: Dec. 22, 1982

[86] PCT No.: PCT/EP82/00271
§ 371 Date: Aug. 9, 1983
§ 102(e) Date: Aug. 9, 1983

[87] PCT Pub. No.: WO83/02249
PCT Pub. Date: Jul. 7, 1983

[30] Foreign Application Priority Data

Dec. 24, 1981 [DE] Fed. Rep. of Germany ....... 3151503

[51] Int. Cl.$^4$ .............................................. B25J 9/00
[52] U.S. Cl. ........................................ 414/5; 414/730;
414/7; 901/3; 901/22; 901/34; 901/50; 623/24
[58] Field of Search ...................... 3/1.2, 1.1; 318/568;
901/1, 3, 5, 50; 414/730, 1-7; 294/19 R

[56] References Cited

U.S. PATENT DOCUMENTS

| 2,858,947 | 11/1958 | Chapman | 414/4 |
| 3,449,769 | 6/1969 | Mizen | 3/1.2 |
| 3,535,711 | 10/1970 | Fick | 3/1.2 |
| 3,631,542 | 1/1972 | Potter | 3/1.1 |
| 3,648,143 | 3/1972 | Harper et al. | 414/4 X |
| 4,046,262 | 9/1977 | Vykukal et al. | 901/1 X |
| 4,302,138 | 11/1981 | Zarudiansky | 414/730 X |
| 4,315,650 | 2/1982 | Yoshida | 294/19 R |

FOREIGN PATENT DOCUMENTS

2558493  5/1979  Fed. Rep. of Germany .......... 414/4

Primary Examiner—Terrance L. Siemens
Attorney, Agent, or Firm—Pollock, Vande Sande and Priddy

[57] ABSTRACT

An assembly robot comprises a breastplate adapted to be attached to the chest of a human operator, an upper arm member connected to the breastplate and adapted to be attached to the upper arm of a human operator, a lower arm member attached to the upper arm member and adapted to be attached to the lower arm of a human operator, a hand member having finger and thumb units into which the hand, finger and thumb of the human operator can be inserted, and a support structure taking the form of a movable chair to which the breastplate is attached and on which the human operator may sit. The robot members, their length, the joints between members, and the axes of these joints correspond to those of a human arm, hand and fingers whereby the robot can make the same movements as the human operator. Each joint is associated with a sensor-motor device. During a programming mode, the robot is attached to the human operator who then performs a desired task, and the signals generated by the sensor portions of the sensor-motor devices are recorded. During a subsequent operating mode the recorded signals are fed to the motor portions of the sensor-motor devices to cause the robot to reproduce the motions of the several members which had occurred during the programming mode, without operator intervention.

14 Claims, 12 Drawing Figures

ASSEMBLY ROBOT

The present invention relates to an assembly robot having several members which are joint-connected with each other and shaped approximately like the arm and finger members of a human hand with regard to their length and joint arrangment. The said robot members are guided by a human operator and at least one sensor and one driving means is assigned to each joint, the sensors being operative to provide signals indicative of the movements when the members are guided by hand, said signals being recorded and, when reproduced, being operative to control a particular driving means which is associated with a particular sensor.

Modern manipulation devices are usually provided with a hand member at the end of a multi-member arm which effects manipulations. For example, the hand member may be used to grip a welding device which welds together automobile body parts. In such an arrangement, the hand member is required to move along certain predetermined paths in space.

A known robot of the foregoing type has a first vertical axis of rotation. The multi-member arm operates to perform horizontal and vertical movements as well as swivel movements resulting from the superimposition of these movements. The hand member is so arranged at the end of the arm that it can be rotated around a first axis of rotation which runs in the axial direction of the arm. The hand member has a second axis of rotation at right angles to said first axis and, finally, a third axis of rotation running at right angles to the second axis of rotation, i.e., it is possible to rotate the hand member about any one or more of three axes.

It is extremely difficult to control the driving motors used in an arrangement of the type described above to effect the different movements of the manipulation device in such a way that the device moves along a desired nonlinear curve. Customarily, therefore, the desired curve is divided into linear path sections and the device is moved along the subdivided curve one section after the other. This leads to high programming complexity for the programmed control of the driving motors. In order to reduce the programming complexity, it is known to surround the arm and gripping members of the manipulation device by a casing having members which correspond to said arm and gripping members (DE-A-24 35 156). The members of the casing are provided with a number of switches corresponding to the number of axes of rotation of the manipulation device. The casing consists essentially of three members which are connected with each other by pivots and which are elastically supported by springs on the arm and gripping members. When the casing is guided by hand thereby to cause relative movements between the members of the manipulation device and the members of the casing, the aforementioned switches are actuated, produce signals which are recorded, and thereby establish a control program for the driving motors of the manipulation device.

The extremely complicated structure of the casing in the foregoing arrangement makes this type of programming device very expensive. The unavoidable play between the members of the casing and of the manipulation device results in erroneous programming, the error increasing with increasing play on the switches. An erroneous programming also results from the fact that the weight of the casing causes signals to be produced by the switches depending on the position of the casing even though no corresponding force has been exerted manually on the casing.

An additional programming device is described in DE-A-28 41 284 which consists of a center part surrounded by a sleeve. The center part is rigidly connected with a member of a robot. The sleeve can be moved in the same axes relative to the center part in which the robot member connected with the center part is movable. Between the center part and the sleeve, sensors are arranged which sense forces occurring in the directions of movement of the sleeve relative to the center part when the sleeve is guided by hand.

The electrical signals generated by the sensors must be converted in complicated conversion processes into control signals for the driving motors of the robot.

The aforementioned programming devices are to be used for robots which are only capable of performing relatively simple movements. The control complexity is considerable in each case and requires complicated computer programs. These robots are generally not suitable to perform assembly work which a person is capable of performing.

Another robot system is described in French Pat. No. 15 37 663 which consists of a master-slave manipulator system. The master is provided with an arm that has a handle at its front end and its members correspond approximately to a human arm with regard to their length and joint arrangement. The members and joints of the slave manipulator correspond to those of the master arm. Sensors are provided at each joint of the master arm to sense the movements of the members when the master arm is guided by hand. The signals of the sensors are recorded, and when subsequently reproduced serve to control the drive motors of the slave manipulator.

In comparison with the robots mentioned previously, the programming complexity is reduced in the robot system of the French patent, but said robot system can perform only some of the assembly work which a human can perform because the axes of the joints of the master arm do not have the range of movement of the axes of human arm joints.

Finally, U.S. Pat. No. 3,648,143 shows a robot similar to that of the French patent but with the difference that the slave robot is also a master system. The driving motors act as sensors which generate signals when the robot members are guided by hand. At the front end of the robot arm one or two members are provided which are comparable to one or two fingers of a human hand. When the members are guided by hand, the electrical motors are simultaneously activated to facilitate the guiding of the members by hand. However, this results in superimposition of the forces exerted by hand and by the motors, and in feedback coupling of the follow-up movements performed by the motors. The movements which are performed later by the members of the robot thus tend to be jerky and are not precise. By designing the robot hand with a maximum of only two finger members that are nonarticulated, only simple movements of the robot hand are possible with the disadvantage that assembly work which a person is capable of performing cannot be performed by this robot.

The object of the present invention is to provide an assembly robot which can manipulate workpieces and tools essentially in the same way as a person.

Embodiments will be described below by reference to the drawings, wherein.

The principal structure of the assembly robot is explained with reference to FIG. 1. The end of an upper arm member 2 is articulated to a breastplate 1 and a lower arm member 3 is articulated to the lower end of member 2. A hand member 4 is articulated to the lower end of arm member 3. The upper arm member 2 can be swiveled around a vertical axis 40 and around a horizontal axis 42 relative to the breastplate 1. The swiveling around the vertical axis 40 is effected by means of a hydraulic cylinder 41 while the swiveling around the horizontal axis 42 is effected by a hydraulic cylinder 43. The lower arm member 3 can be swiveled around an axis 44 relative to the upper arm member 2 by a hydraulic cylinder 45. The lower arm member 3 has two parts which are connected by a swivel joint 46. The axis of the swivel joint 46 is coincident with the axis of the lower arm member 3. The swivel joint 46 has a driving motor (not shown). The lower arm member 3 is connected with the hand member 4 by a knuckle joint 47 having a pair of axes which are perpendicular to each other and perpendicular to the axis of the swivel joint 46.

The breastplate 1 is fastened to a chair 49 and is vertically adjustable by means of a sliding guide 48. The chair 49 is carried by wheels 52 which can be rotated in all directions. The breastplate has two parts, i.e., an upper part and a lower part, which are connected with each other by means of a joint 50 having a horizontal axis. A swivel motion around the axis of the joint 50 can be effected by the hydraulic cylinder 51. The chair 49 is connected to a first lever arm 53 which is connected to a second lever arm 54 by a joint 58' having a vertical axis of rotation. The second lever arm 54 is connected to a support 55 by a joint 59' having a vertical axis of rotation.

A sensor is provided for each of the aforementioned hydraulic cylinders 41, 43, 45 and 51 as well as for each joint and articulated axis. Details will be explained below with the help of FIG. 2.

The programming mode of operation of the robot is as follows:

A human operator 5 sits down on the chair 49. The breastplate 1 is connected with the upper part of the operator's body in a manner which will be explained with the help of FIG. 11. The hands of the operator 5 are inserted into the glove-like hand members 4 and the upper arm and the lower arm of the operator 5 are connected with the upper arm and lower arm members 2 and 3 respectively.

Figures 1, 1A:
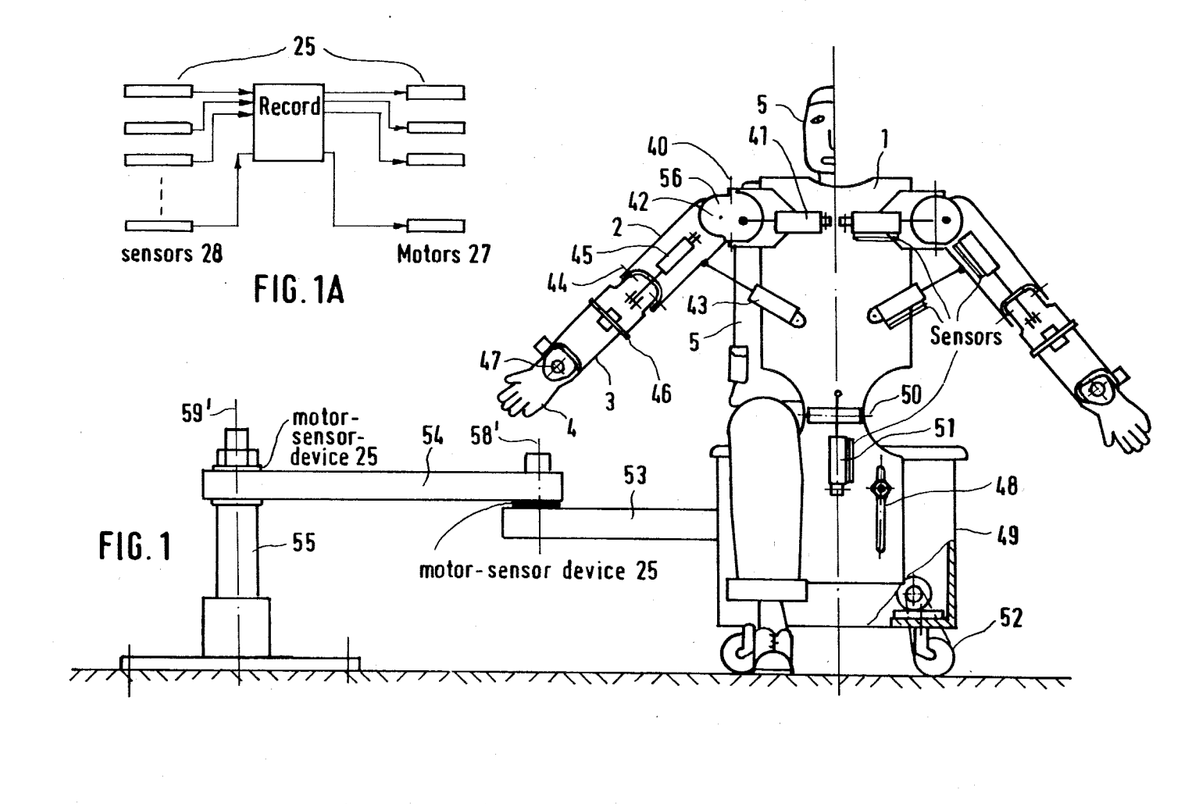
FIG. 1 is a front view of a first embodiment of the assembly robot of the present invention.
FIG. 1A diagrammatically illustrates the sensor-driving motor-recorder arrangement used in the invention.

All movements which the operator 5 makes with the upper part of his body, with his arms, and with his hands and fingers, are sensed by the sensors provided for all of the joint axes and the electrical signals generated by the sensors are recorded, as shown illustratively in FIG. 1A. The same applies to sensor signals that are generated when the operator 5 moves the chair 49 with his feet.

The operator 5 executes the work which the assembly robot is intended to perform subsequently.

After the operator 5 has executed the work which the robot is to perform subsequently, the operator 5 is detached from the assembly robot and, during the subsequent operating mode of the robot, the recorded signals then control the driving means, for example the cylinders 41, 43, 45, 51 for the different motion axes, as also shown illustratively in FIG. 1A.

The structure of the hand member 4, which can also be called a gripping and assembly device, will now be explained in detail by reference to FIGS. 2 to 5.

Figure 2:
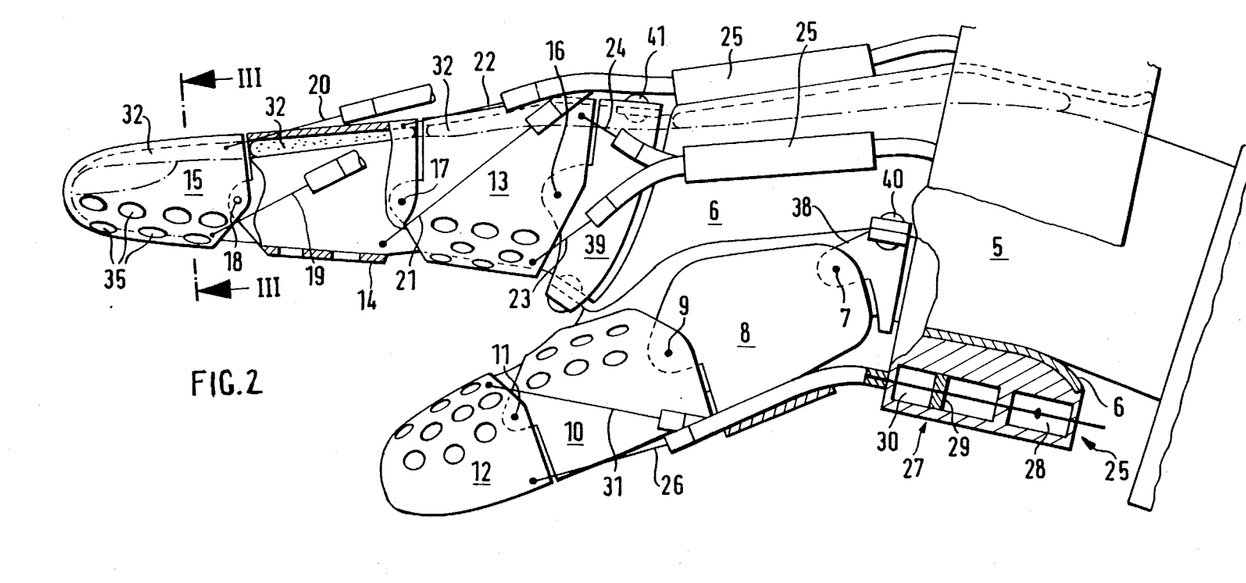
FIG. 2 depicts a hand member of the FIG. 1 robot, partially in cross section.

FIG. 2 shows the hand member 4 during the programming mode of operation of the assembly robot as the hand member 4 is manipulated by the hand of the operator 5 performing a desired operation.

A hollow central hand member 6 is connected with the lower arm member 3 of the robot by means of the knuckle joint 47 (FIG. 1). A first hollow thumb member 8 is articulated to the hand member at a joint 7. A second hollow thumb member 10 is articulated to thumb member 8 at a joint connection 9 and a third hollow thumb member 12 is articulated to thumb member 10 at another joint connection 11. The hollow thumb members 8, 10, 12 are shaped to simulate the phalanges of a human thumb.

The same applies to the hollow finger members 13, 14, 15 which simulate the phalanges of a human index finger. The hollow finger member 13 is connected to the center hand member 6 by a joint 16, the hollow finger member 14 is connected to the hollow finger member 13 by a joint 17, and the hollow finger member 15 is connected to the hollow finger member 14 by a joint 18.

Depending on the tasks to be accomplished by the gripping and assembly device, i.e., the hand member 4, additional hollow members can be provided which simulate the middle finger, the ring finger and the little finger of a human hand.

A relatively stiff cable line engages both sides of each joint 7, 9, 11, 16, 17, 18 so that the individual hollow members 8, 10 and 12–15 can be swiveled around their repective joints 7, 9, 11, 16, 17 and 18. Thus, hollow finger member 15 can be moved in opposite directions about joint 18 by the cables 19, 20; hollow finger member 14 is moved by the cables 21, 22, and hollow finger member 13 is moved by the cables 23, 24. Analogous pairs of cables are provided to move the hollow thumb members of the hand member 4.

Each cable is connected to a motor-sensor device 25 which is rigidly mounted on the center hand member 6. The motor-sensor device 25 for the cable 26 of the hollow thumb member 12 is shown in cross section. Each motor-sensor device 25 consists of a motor part 27 and a sensor part 28. The motor part 27 is preferably a linear motor, preferably a cylinder having a piston 29 moving inside the cylinder, the piston being connected to an associated cable, e.g., cable 26. The sensor part 28 consists of a motion sensor of known design to which the cable 26 is also connected.

During the programming mode of operation, no pressure medium acts upon the motor part 27 of the motor-sensor devices 25. The movements performed by the hand of the operator 5 and the phalanges of his thumb and fingers simultaneously effect like movements of the hollow hand, thumb and finger members of the robot and are transmitted to the sensor parts 28 of the devices 25 by the relatively stiff cables 19–24, 26 and 31. The sensed motions are transformed into electrical signals by the sensor parts 28 which are recorded (FIG. 1A). These recorded signals control the gripping and assembly program that is subsequently carried out without intervention of the human operator during a later operating mode of operation of the robot.

The recorded sensor signals, when read out of the memories in which the signals are stored, control the input and output of a fluid, e.g., oil, to and from the pressure chambers 30 of the cylinders of the motor-sensor devices 25 by means of valves (not shown). When oil is fed under pressure into the chamber 30 of the cylinder associated with the cable 26, the piston 29 moves to the right thereby causing the hollow thumb member 12 to swivel around the axis of joint 11 in a counter-clockwise direction. When the thumb member 12 is to perform a rotary movement in a clockwise direction around the axis of joint 11, oil is introduced under pressure into the pressure chamber of the cylinder associated with the cable 31.

Instead of using motor parts 27 which are cylindrical in shape, other types of motors can be used to effect the swiveling of a respective hollow thumb or finger member around its articulated axis. Moreover, instead of using cables between the motors and the respective hollow members, the transmission of forces could also be effected by means of levers which are connected eccentrically to the respective hollow members, relative to their respective joints, whereby a given motor moves an associated lever to exert forces in both directions of movement of the hollow finger or thumb member. However, the hydraulic cylinders shown in FIG. 1 are preferably used to effect movement of the robot members associated therewith around the axes of joints 40, 42, 44, 47 and 50.

The movement of the hollow members by means of the motor parts 27, during the operating mode of operation, are sensed by the sensor parts 28, and the outputs of the sensors during the operating mode can accordingly be utilized to determine the actual positions of the hollow members for comparison with the sensor signals that were previously recorded during the programming mode of operation.

Figures 3, 6:
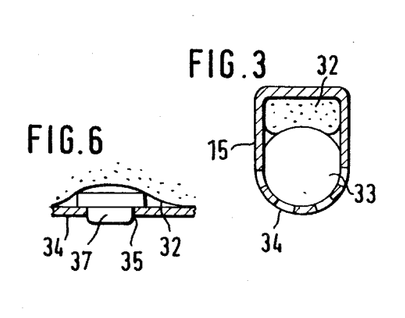
FIG. 3 is a cross section along line III—III in FIG. 2 during the programming mode of operation.
FIG. 6 is a partial cross section through a gripping surface of a hollow member of a robot finger having a pressure sensor.

To clearly establish the position of the hand of the human operator 5 with respect to the gripping and assembly device, i.e., the hand member 4, during the programming mode of operation, an inflatable hose 32 is provided on the inside of each hollow finger and thumb member on the side opposite to the gripping surface. After the hand of the operator 5 has been inserted into the hand member 4 of the robot, the hose 32 is inflated to urge the gripping surface of the operator's fingers into contact with the inner side of the gripping surface of the corresponding hollow members. This is shown in FIG. 3 where the operator's finger 33 is in contact with the inner side of the gripping surface 34 of the hollow finger member 15.

Figures 4, 5:
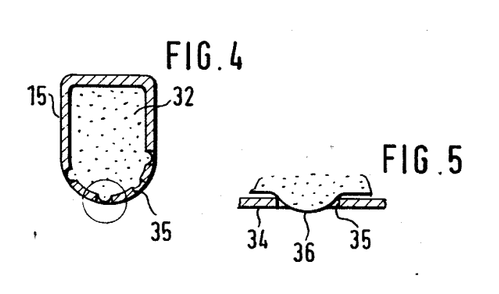
FIG. 4 is a cross section along line III—III in FIG. 2 during the operating mode of operation.
FIG. 5 is a detail of the cross section of the portion outlined by the circle in FIG. 4.

Preferably, the gripping surface 34 of each hollow finger and thumb member is provided with perforations 35. During the operating mode of operation of the robot, the hose 32 is inflated to such an extent that it can penetrate the perforations 35 in a nub-like manner. This is shown in FIG. 5. The nubs 36 projecting beyond the gripping surface 34 improve the hold of the robot hand member on the workpiece to be held.

Pressure sensors 37 may be inserted into some of the perforations 35 for purposes of monitoring the gripping pressure between the respective finger member and the object being held, i.e., the workpiece. If this pressure exceeds a certain value, the signal of the sensor 37 can be used to slacken the closing movement of the gripping robot hand member.

The hollow center hand member 6 is connected in an articulated manner to the lower arm member 3 of the robot. The connection is effected by the knuckle joint 47 (FIG. 1) whose rotary axes are perpendicular to each other and also perpendicular to the rotary axis of the joint 46. The center hand member 6 can perform rotary and/or swivel movements relative to the lower arm member 3 which are sensed during the programming mode of operation by the aforementioned sensors, the signals generated by the sensors being recorded and used subsequently, during the operating mode, to actuate the motors which are provided for the axes of the knuckle joint 47 and of the rotary joint 46 in order to reproduce corresponding rotary and/or swivel movements.

The respective first hollow members of the thumb and finger units of the robot, for example the hollow members 8 and 13, can be connected for lateral movements. For this purpose, they are connected to the center hand member 6 by intermediate members 38 or 39 which are fastened to the center hand member 6 at joints 40 and 41 respectively whose axes are perpendicular to the axes of the joints 7 and 16. Motor-sensor devices 25 are provided for the joints 40, 41 for the purposes described previously in respect to the other motor-sensor devices.

In the embodiment of FIG. 1, an intermediate member 56 is provided between the breastplate 1 and the upper arm member 2. The cylinder 41 is connected to the breastplate 1 and to the upper arm member 2 by joints having vertical axes. The cylinder 43 between the breastplate 1 and the upper arm member 2 is connected to the breastplate 1 and to the upper arm member 2 by ball-and-socket joints. A joint having a vertical axis and an associated motor-sensor can be provided between the first lever arm 53 and the chair 49 in a manner analogous to the joints 58', 59' between the two lever arms 53, 54 and the second lever arm 54 and the support 55 respectively. When the chair 49 is moved by the operator 5, the respective sensors generate signals that correspond to the motions or the swivel angles, which signals are stored. When the stored signals are later read out, the chair 49 will be moved by means of the motors in accordance with the stored or recorded signals.

As has already been mentioned, the vertical joint 50, together with the hydraulic cylinder 51, is used to perform pitching motions of the upper part of the breastplate 1.

The foregoing discussion is equally applicable to both of the robot arms shown in FIG. 1.

Figure 7:
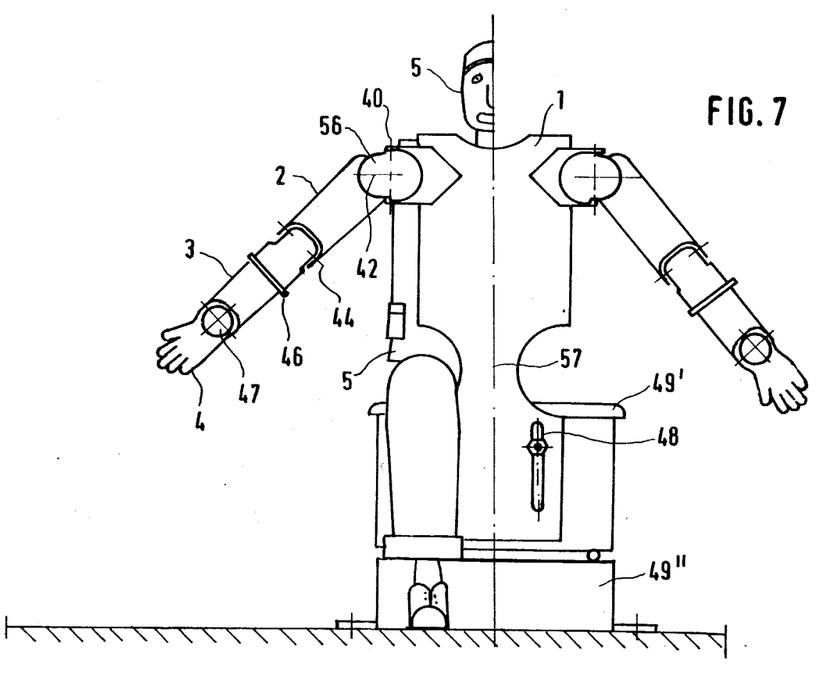
FIG. 7 is a front view of a second embodiment of the assembly robot.

In a further embodiment of the invention shown in FIG. 7, the breastplate 1' is of one piece construction and is fastened to an upper chair part 49' in a vertically adjustable manner. The upper chair part 49' is connected to a lower chair part 49" for rotation around a vertical axis 57. A driving motor and a sensor are provided between the two chair parts 49' and 49" and rotation around axis 57 performed by the operator 5 is sensed by this sensor and transformed into electrical signals which are recorded so that, when these recorded signals are later read out of storage the aforementioned driving motor will be actuated to reproduce the rotary movement between the two chair parts 49' and 49". The embodiment of FIG. 7 is otherwise the same as that of FIG. 1.

Figure 8:
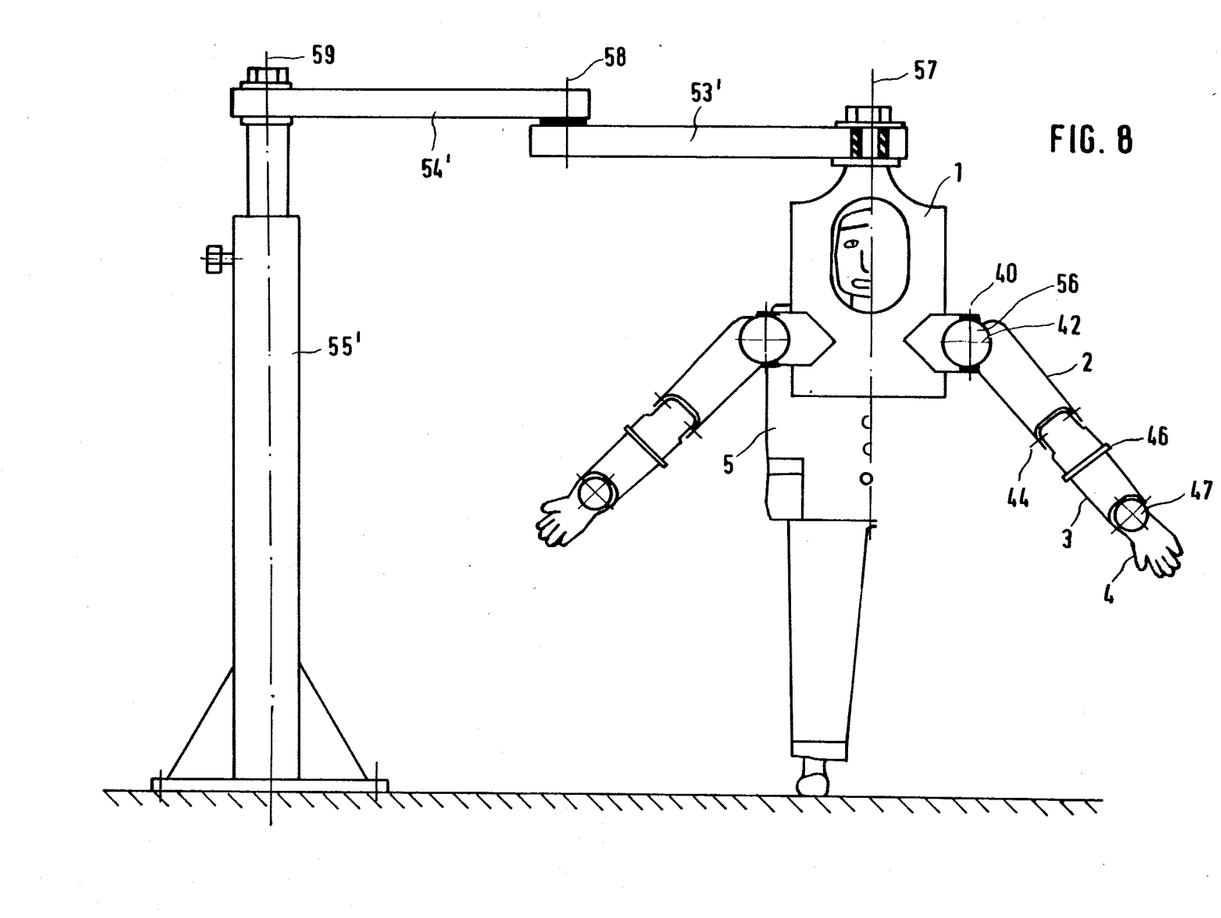
FIG. 8 is a front view of a third embodiment of the assembly robot.

In the embodiment of FIG. 8, the breastplate 1 is rotatably connected to a first lever arm 53' at a vertical axis 57. This first lever arm 53' is rotatably connected to a second lever arm 54' at vertical axis 58 and the second lever arm 54' is connected to a support 55' at a vertical axis 59. The support 55' is vertically adjustable. A motor and a sensor is provided at each joint axis 57, 58 and 59. Movements carried out by the operator 5 are sensed by the sensors and the signals generated by the sensors during the programming mode of operation are recorded for use during a subsequent operating mode of operation as described above.

Figure 9:
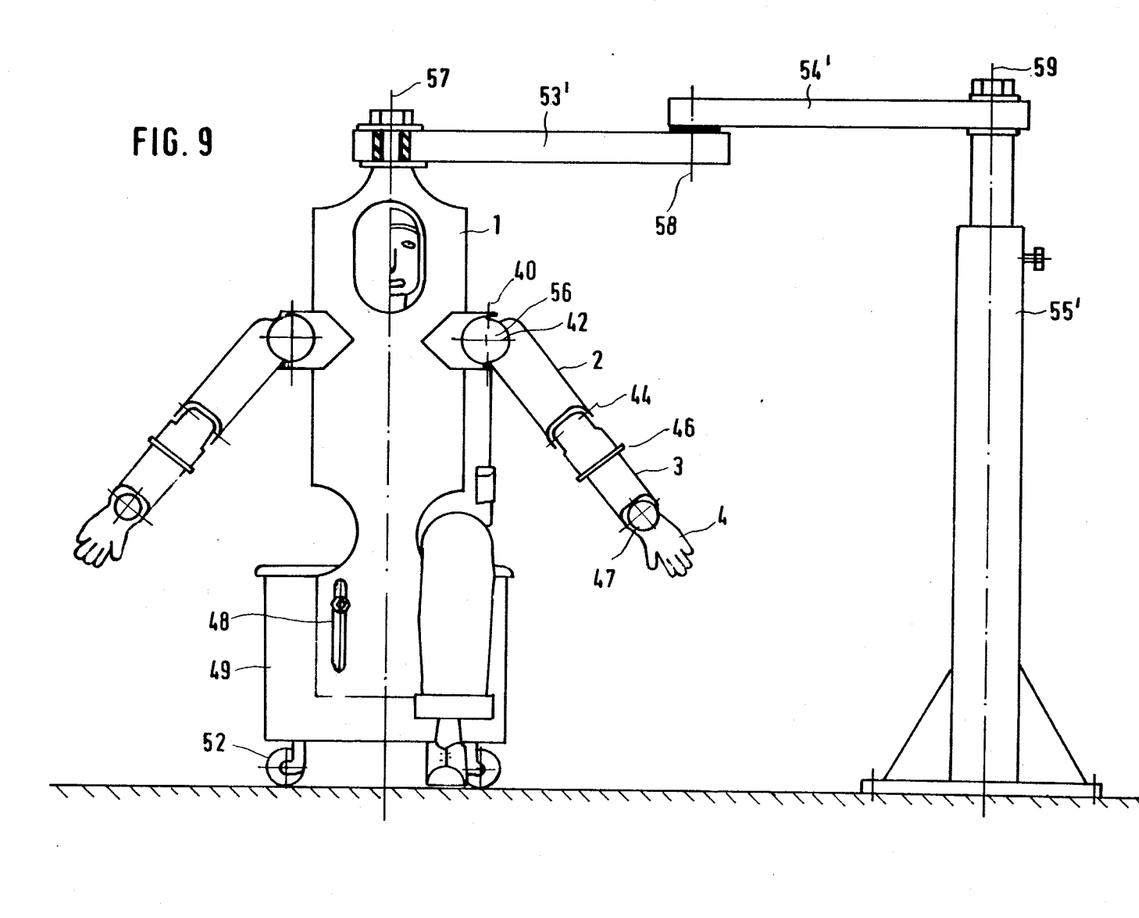
FIG. 9 is a front view of a fourth embodiment of the assembly robot.

In the embodiment of FIG. 9, the breastplate 1 is again supported by the lever arms 53' and 54' and by the support 55' in accordance with FIG. 8 but the operator 5 does not stand up as in FIG. 8 but sits on a chair 49 having casters 52.

Figure 10:
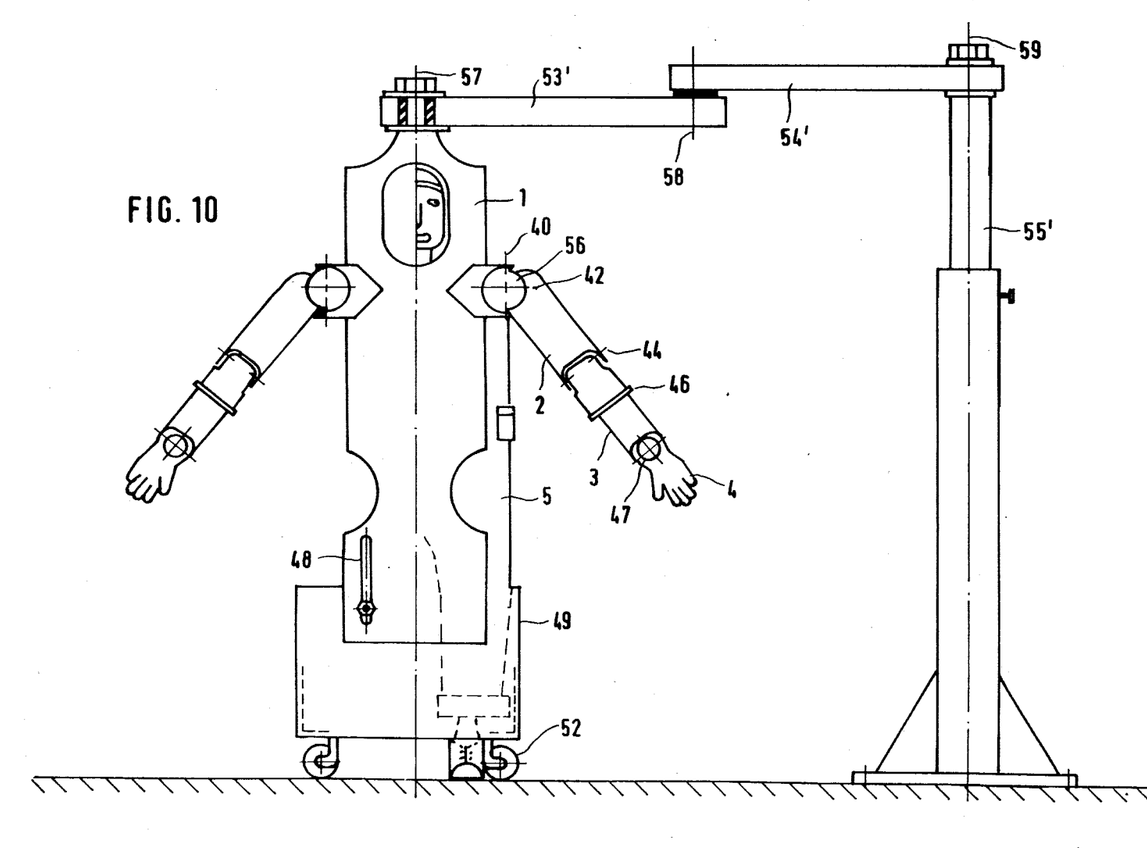
FIG. 10 is a front view of a fifth embodiment of the assembly robot.

In the embodiment of FIG. 10, the breastplate 1 is the same as in FIG. 9 but the chair 49' is hollow so that the operator 5 is able to walk.

Figure 11:
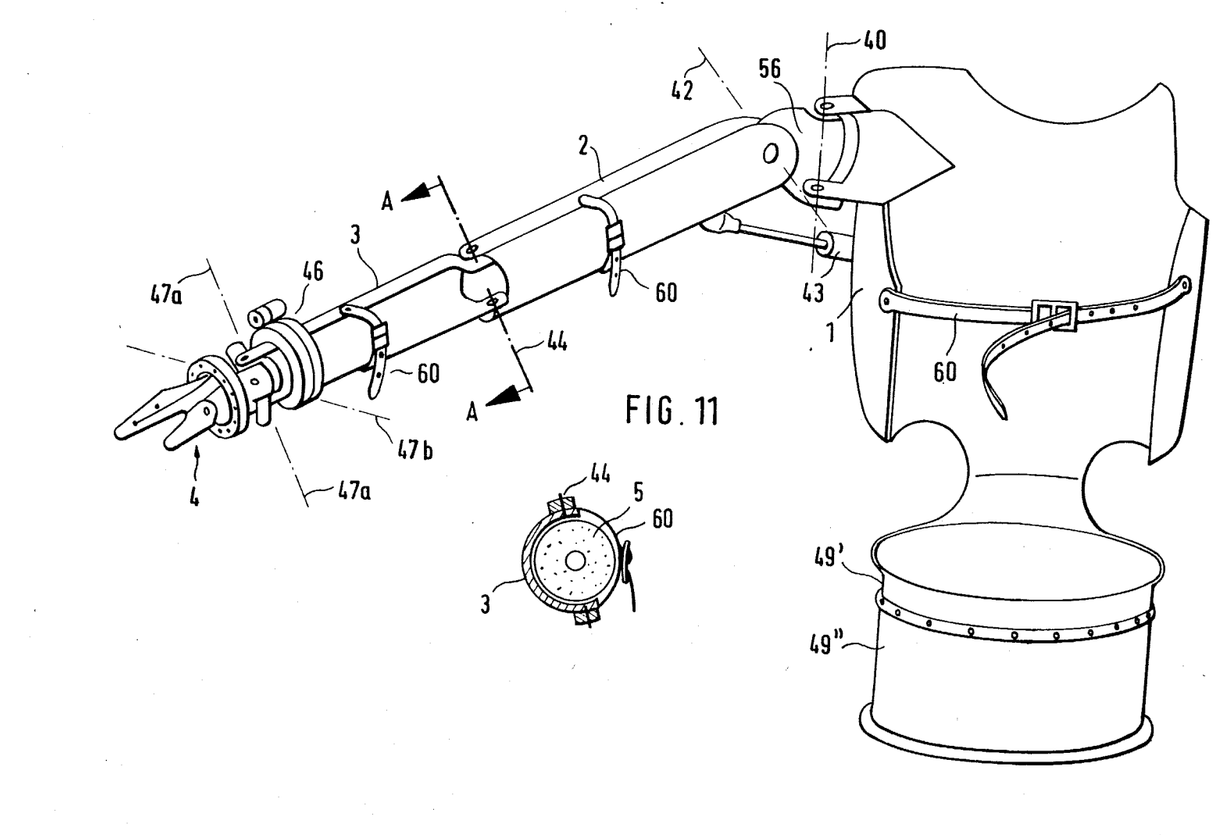
FIG. 11 is a perspective view of the rear of the upper part of an assembly robot.

FIG. 11 shows that the cup-shaped breastplate 1 and the two arm members 2 and 3 are each provided with strapping devices 60 so that the breastplate 1 and members 2, 3 can be strapped onto the operator 5. The hand member 4 is designed like a glove into which the operator 5 can insert his hand and his fingers.

The cup-shaped or hollow design of the members 1, 2 and 3 has the advantage that the axes of the joints between the said members of the assembly robot coincide with the axes of the joints of the human operator. As a result, a smooth guiding and moving of the members of the robot is possible during the programming.

The assembly robot is suitable for use in the assembly of workpieces and the handling of tools during the assembly of workpieces. It is particularly suitable for assembly work that requires use of two human hands.

The sensors used in the present invention serve not only to generate signals during the programming of the robot by an operator 5 but also serve to indicate the actual positions of the robot members during the subsequent operation of the robot thereby permitting adjustment of the positions of the members during the operating mode by comparison between the actual position of each member and the stored signal that indicates the desired position of that member.

I claim:

1. An assembly robot adapted to be manipulated by a human operator to perform a task during a programming mode of operation wherein different portions of said robot are moved during said programming mode of operation and signals representative of the movements are recorded for purposes of later driving said different portions of said robot to effect like movements during an operating mode of operation thereby to repeat the performance of said task without intervention by the human operator, said assembly robot comprising a breastplate which is connectable to the upper part of the body of a human operator during said programming mode, an upper arm member connectable to an upper arm of the human operator during said programming mode, said upper arm member being connected at one end thereof to said breastplate by a joint having both a horizontal axis and a vertical axis whereby said upper arm member may be moved relative to said breastplate by the human operator about said horizontal and vertical axes through ranges of movement which fully correspond to those of the human operator's shoulder joint, first sensor means for sensing movements of said upper arm member relative to said breastplate about said horizontal axis, means for recording the output of said first sensor means during said programming mode, first driving means between said breastplate and said upper arm member responsive to the recorded output of said first sensor means for moving said upper arm member about said horizontal axis during said operating mode, second sensor means for sensing movements of said upper arm member relative to said breastplate about said vertical axis, means for recording the output of said second sensor means during said programming mode, second driving means between said breastplate and said upper arm member responsive to the recorded output of said second sensor means for moving said upper arm member about said vertical axis during said operating mode, a lower arm member connectable to the lower arm of the human operator during said programming mode, means connecting one end of said lower arm member to the other end of said upper arm member for pivotal motion about a third joint through a range of movement fully corresponding to that of the human operator's elbow joint, third sensor means for sensing movements of said upper and lower arm members relative to one another about said third joint, means for recording the output of said third sensor means during said programming mode, third driving means between said upper and lower arm members responsive to the recorded output of said third sensor means for moving said upper and lower arm members relative to one another about said third joint during said operating mode, a hollow hand member adapted to receive the hand of the human operator during said programming mode, said hollow hand member being connected to the other end of said lower arm member by a knuckle joint having fourth and fifth pivotal axes that are prependicular to one another, fourth and fifth sensor means for sensing movements of said hollow hand member relative to said lower arm member about said fourth and fifth axes respectively, means for recording the outputs of said fourth and fifth sensor means during said programming mode, fourth and fifth driving means responsive respectively to the recorded outputs of said fourth and fifth sensor means for moving said hollow hand member relative to said lower arm member about said fourth and fifth axes respectively during said operating mode, said hollow hand member including a hollow central hand member which is connected to said lower arm member by said knuckle joint, a plurality of hollow thumb members interconnected sequentially to one another and to said central hand member by a plurality of pivotal thumb joints, said plural hollow thumb members forming a hollow articulated thumb unit which receives the thumb of the human operator and which is capable of movements about said thumb joints through ranges of movement fully corresponding to those of the human operator's thumb during said programming mode, a plurality of thumb member sensor elements for sensing movements of said thumb members about said plurality of thumb joints respectively, means for recording the outputs of said thumb member sensor elements during said programming mode, a plurality of thumb member driving means responsive respectively to the recorded outputs of said thumb member sensor elements for moving said hollow thumb members relative to one another and relative to said central hand member about said plurality of thumb joints respectively during said operating mode, a plurality of hollow finger members interconnected sequentially to one another and to said central hand member by a plurality of pivoted finger joints, said plural hollow finger members forming a hollow articulated finger unit which receives a finger of the human operator during the said programming mode and which is capable of movements about said finger joints through ranges of movement fully corresponding to those of the human operator's finger, a plurality of finger member sensor elements for sensing movements of said finger members about said plurality of finger joints respectively, means for recording the outputs of said finger member sensor elements during said programming mode, and a plurality of finger member driving means responsive respectively to the recorded outputs of said finger member sensor elements for moving said hollow finger members relative to one another and relative to said central hand member about said plurality of finger joints respectively during said operating mode.

2. The assembly robot of claim 1 wherein the gripping surfaces of said hollow finger members are perforated, and an inflatable hose element in said hollow articulated finger unit opposite to the perforated gripping surfaces of said finger members for urging the finger of the human operator toward said gripping surfaces during said programming mode.

3. The assembly robot of claim 2 including a pressure sensor on at least one of said perforated gripping surfaces.

4. The assembly robot of claim 1 including a first horizontal arm pivotally connected to said breastplate, a second horizontal arm pivotally connected to said first horizontal arm, and a vertical support pivotally connected to said second horizontal arm, a plurality of further sensor devices operative respectively during said programming mode to sense movements of said first horizontal arm relative to said breastplate, to sense movements of said second horizontal arm relative to said first horizontal arm, and to sense movements of said second horizontal arm relative to said vertical support, means for recording the outputs of said plurality of further sensor devices during said programming mode, and a plurality of further driving means responsive respectively to said recorded outputs of said further sensor devices for moving said first horizontal arm relative to said breastplate, for moving said second horizontal arm relative to said first horizontal arm, and for moving said second horizontal arm relative to said vertical support respectively during said operating mode.

5. The assembly robot of claim 1 wherein said breastplate is connected to a mobile chair, said chair being vertically adjustable in position.

6. The assembly robot of claim 5 wherein said chair comprises upper and lower parts which can rotate relative to one another about a vertical axis.

7. The assembly robot of claim 1 wherein said breastplate comprises at least two parts which are pivotally connected to one another for motion relative to one another about a horizontal breastplate axis, and motor means for moving said two parts of said breastplate relative to one another about said horizontal breastplate axis.

8. The assembly robot of claim 1 wherein said thumb member driving means and said finger member driving means each comprises a linear motor connected to an associated part of said assembly robot by a cable.

9. The assembly robot of claim 1 wherein each of said thumb member driving means and each of said finger member driving means is mounted on said central hand member, the driving means associated with each of said thumb joints and each of said finger joints comprising a pair of driving motors which act respectively on opposite sides of said joint.

10. The assembly robot of claim 1 wherein said lower arm member comprises two arm member portions which are interconnected to one another by a swivel joint which is coaxial with the axis of said lower arm member.

11. The assembly robot of claim 1 wherein the thumb joint interconnecting said articulated thumb unit to said central hand member includes a pivot joint which is oriented transverse to the thumb joints interconnecting said thumb members to one another.

12. The assembly robot of claim 11 wherein the thumb joint interconnecting said articulated thumb unit to said central hand member includes a further pivot joint which is oriented parallel to the thumb joints interconnecting said thumb members to one another.

13. The assembly robot of claim 1 wherein the finger joint interconnecting said articulated finger unit to said central hand member includes a pivot joint which is oriented transverse to the finger joints interconnecting said finger members to one another.

14. The assembly robot of claim 13 wherein the finger joint interconnecting said articulated finger unit to said central hand member indluces a further pivot joint which is oriented parallel to the finger joints interconnecting said finger members to one another.

* * * * *